(12) United States Patent
Dues et al.

(10) Patent No.: US 10,406,654 B2
(45) Date of Patent: Sep. 10, 2019

(54) PCBN COMPACT FOR MACHINING OF FERROUS ALLOYS

(71) Applicant: DIAMOND INNOVATIONS, INC., Worthington, OH (US)

(72) Inventors: Lawrence Thomas Dues, Dublin, OH (US); Kenji Yumoto, Gifu-Ken (JP)

(73) Assignee: DIAMOND INNOVATIONS, INC., Worthington, OH (US)

(*) Notice: Subject to any disclaimer, the term of this patent is extended or adjusted under 35 U.S.C. 154(b) by 0 days.

(21) Appl. No.: 15/793,098

(22) Filed: Oct. 25, 2017

(65) Prior Publication Data

US 2019/0118344 A1   Apr. 25, 2019

(51) Int. Cl.

| | |
|---|---|
| *B24D 3/02* | (2006.01) |
| *B24D 18/00* | (2006.01) |
| *C22C 26/00* | (2006.01) |
| *B22F 3/14* | (2006.01) |
| *C04B 35/5831* | (2006.01) |
| *C04B 35/63* | (2006.01) |
| *C04B 35/645* | (2006.01) |
| *B24D 3/00* | (2006.01) |
| *B24D 11/00* | (2006.01) |
| *C09K 3/14* | (2006.01) |
| *B22F 7/06* | (2006.01) |

(52) U.S. Cl.
CPC ........... *B24D 18/0009* (2013.01); *B22F 3/14* (2013.01); *C04B 35/5831* (2013.01); *C04B 35/6303* (2013.01); *C04B 35/645* (2013.01); *C22C 26/00* (2013.01); *B22F 2007/066* (2013.01); *C04B 2235/40* (2013.01); *C04B 2235/402* (2013.01); *C04B 2235/404* (2013.01); *C04B 2235/405* (2013.01); *C04B 2235/5436* (2013.01); *C04B 2235/80* (2013.01); *C22C 2026/003* (2013.01)

(58) Field of Classification Search
USPC ........................................ 51/293, 307, 309
See application file for complete search history.

(56) References Cited

U.S. PATENT DOCUMENTS

| | | |
|---|---|---|
| 1,589,503 A | 6/1926 | Youngblood |
| 2,947,617 A | 8/1960 | Wentorf |

(Continued)

FOREIGN PATENT DOCUMENTS

| | | |
|---|---|---|
| EP | 2266730 A | 12/2010 |
| JP | 2011189421 A | 9/2011 |

OTHER PUBLICATIONS

Massalski, Thaddeus B, (Editor): Binary Alloy Phase Diagrams, Co-W (Cobalt-Tungsten), Binary Alloy Phase Diagrams, American Society of Metals, US: vol. 2, Jan. 1, 1990, pp. 1257-1259, XP002438271, p. 1258.

(Continued)

*Primary Examiner* — James E McDonough

(57) ABSTRACT

The present application is a new improvement in the fine-grained cubic Boron Nitride sintered compact which may be employed to manufacture a cutting tool. The compact contains at least 80 vol % cBN and is sintered under HPHT conditions. The invention has lower levels of unreacted cobalt in the final sintered material than conventions materials. The invention has proved beneficial in the machining of ferrous metal alloys such as sintered metal alloys.

20 Claims, 6 Drawing Sheets
(6 of 6 Drawing Sheet(s) Filed in Color)

ELEMENTAL MAP

- EDS maps of cBN materials
- 3 elements of interest are chosen and assigned to a color channel. Example:
  - Cobalt is assigned to Red
  - W is assigned to Blue
  - Boron is assigned to green
- The 3 color channels are merged to create a composite image with each color indicating a specific element or combination of elements.

(56) References Cited

U.S. PATENT DOCUMENTS

| | | | |
|---|---|---|---|
| 3,233,988 | A | 2/1966 | Wentorf, Jr. et al. |
| 3,743,489 | A | 7/1973 | Wentorf, Jr. et al. |
| 3,767,371 | A | 10/1973 | Wentorf, Jr. et al. |
| 3,918,219 | A | 11/1975 | Wentorf et al. |
| 4,188,194 | A | 2/1980 | Corrigan |
| 4,311,490 | A | 1/1982 | Bovenkerk et al. |
| 4,807,402 | A | 2/1989 | Rai |
| 4,911,756 | A | 3/1990 | Nakai et al. |
| 5,271,749 | A | 12/1993 | Rai et al. |
| 5,608,911 | A | 3/1997 | Shaw et al. |
| 6,500,557 | B1 | 12/2002 | Koizumi et al. |
| 6,814,775 | B2 | 11/2004 | Scurlock et al. |
| 8,354,353 | B2 | 1/2013 | Abds-Sami et al. |
| 8,789,626 | B2 | 7/2014 | Can et al. |
| 2004/0002418 | A1* | 1/2004 | Scurlock ............... B23B 27/148  501/96.4 |
| 2005/0226691 | A1 | 10/2005 | Park |
| 2010/0038148 | A1* | 2/2010 | King ............... C04B 35/515  175/430 |
| 2011/0020163 | A1* | 1/2011 | Nilen ............... C22C 26/00  419/10 |
| 2014/0367178 | A1* | 12/2014 | Azar ............... E21B 10/26  175/431 |

OTHER PUBLICATIONS

Yongjun, Li, et al., Study of High-Pressure Sintering Behavior of cBN Composites Starting with cBN-Al Mixtures, Journal of Materials Research: 23(9), Sep. 1, 2008, pp. 2366-2373.

* cited by examiner

Tool performance in machining of sintered alloy gear part showed an increased tool life with increasing amount of CoB/Co ratio.

PCBN COMPACT FOR MACHINING OF FERROUS ALLOYS

SUMMARY

A polycrystalline cubic boron nitride (PcBN) compact comprised of, in volume percent, from about 80% to of about 95% of cBN; and a metallic binder system. The PcBN compact is especially useful in machining iron and similarly chemical reactive parts, such as sintered powder metal alloys.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

BACKGROUND

Figure 1:
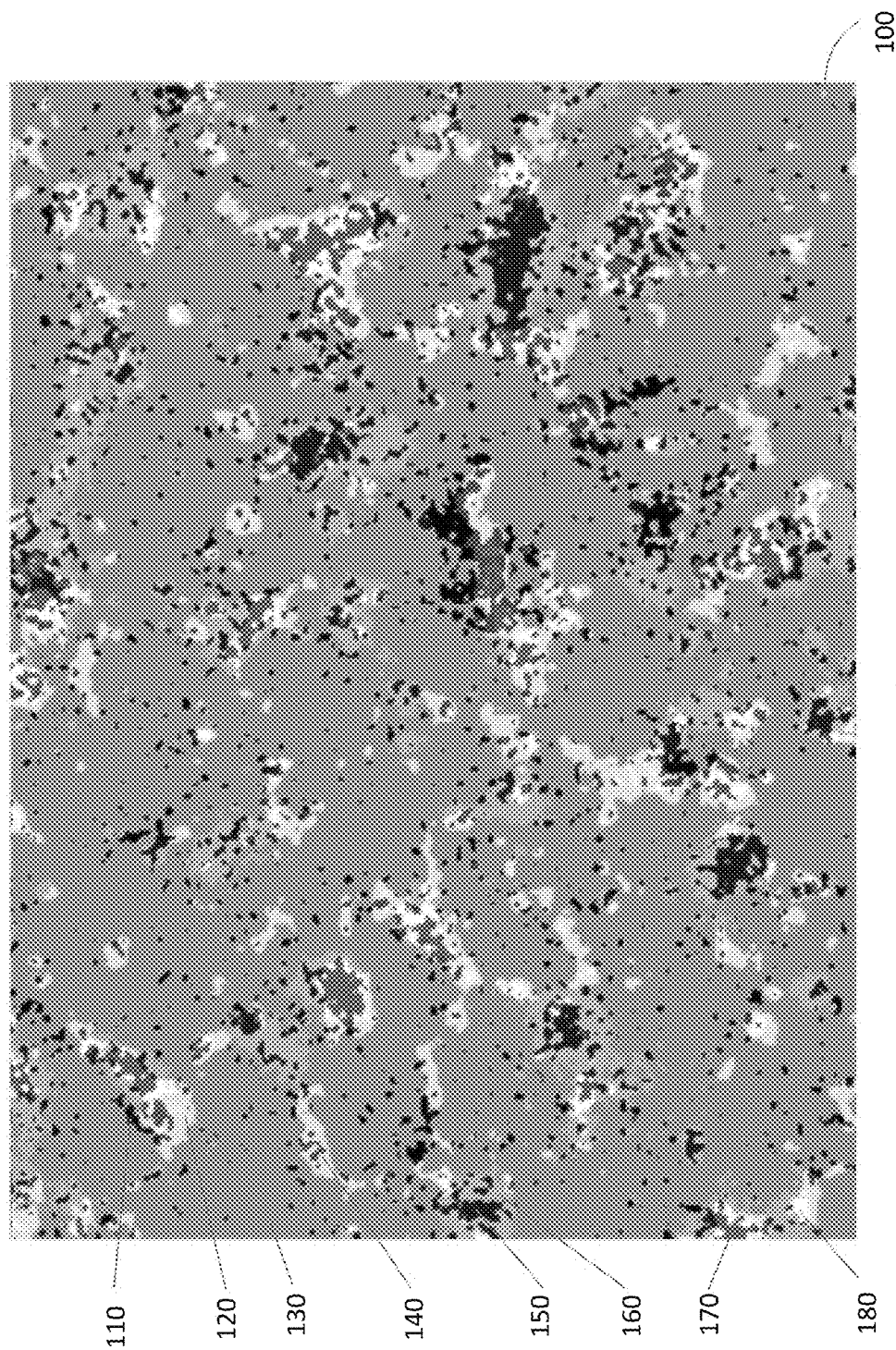
FIG. 1 is an electron microscope image of the preferred embodiment of the present invention.

Manufacture of cBN by the high pressure/high temperature (HP/HT) process is known in the art and explained in U.S. Pat. No. 2,947,617. A process for making sintered polycrystalline cBN compacts, which utilizes pyrolytic hexagonal boron nitride (PBN) in the absence of a catalyst is described in U.S. Pat. No. 4,1888,194. An improvement on such direct conversion process is described in U.S. Pat. No. 4,289,503, where boric oxide is removed from the surface of the HBN powder before the conversion process.

A compact as used in the cutter art comprises a mass of abrasive particles bonded together in a self-bonded relationship, by means of a bonding medium, or by means of combinations thereof. A composite compact is a compact bonded to a substrate material, such as cemented metal carbide. U.S. Pat. No. 3,918,219 describes the catalytic conversion of hexagonal boron nitride (HBN) to cBN in contact with a carbide mass to form a composite cBN compact. Compacts or composite compacts may be used in blanks for cutting tools, drill bits, dressing tools, and wear parts

DETAILED DESCRIPTION OF THE INVENTION

The novel cBN compacts are especially useful in forming tools, such as are used in the machining of workpieces. The utility that the inventive cBN compacts have in machining chemically reactive materials in one embodiment of the invention.

The term "chemically reactive materials" means materials that chemically react with the tool material, such as, ferrous workpieces that react with diamond took at elevated temperature. Inventive sintered cBN compacts may be machine powder metal parts made from powder metals that are consolidated or densified to form workpieces or parts, and may be densified from iron powder by powder metal processing.

The sintered cBN compacts of the present invention demonstrate excellent performance in machining chemically reactive materials, such as, powder metal iron. The inventive cBN sintered compacts excel in machining powder metal parts manufactured by consolidation of metal powder), such as now are common in the automotive industry, such as gears, valve seats, and the like. The metric comparing the inventive cBN sintered compacts is the useful life off the tool, which is determined by the quantity of machining it can complete before the tool fractures or the surface finish of the machined metal becomes unacceptable. The inventive cBN sintered compacts have tested and found in one embodiment, to perform better than conventional compacts by a factor of more than 3 to 1.

In manufacturing the inventive sintered cBN compacts, feedstock powder can be milled to the desired particle size and mixed by a variety of techniques, including, for example, ultrasonic mixing, ball rill mixing, attrition mill mixing, and the like.

Milling often is accomplished in the presence of a solvent such as, but not limited to, alcohols, acetones, and like solvents that can be readily removed and do not promote undesirable oxidation of the metal powders being milled. Such milling usually does not result in the oxidation of the powders to any undesirable degree. Milling temperatures will be ambient and times can range up to several hours. Adjusting the size of the ball milling apparatus proportionately may make blended mixtures ranging in size from 100 g to 2 kg, or larger.

The blended mixture is dried to remove the solvent (such as, isopropyl alcohol, acetone) at a temperature below the flash point of the solvent. The powder subsequently is granulated to aid in further processing. The composition of the blended material can be modified so that the relative contents of the ingredients adhere to the ranges desired.

The powder may be subjected to sintering using conventional HPHT techniques and apparatus well known in the art, such as described above. The powder is loaded in refractory metal cups (e.g., Ta or Nb). The size of the cups limits the size of the final sintered compact. A backing substrate material (powder or compact) can be loaded into the cup for in situ bonding to the sintered cBN compact, as is known in this art. Suitable substrates include, for example, refractory metal (e.g., W) carbides. Crimping the cup material around the edges of the substrate seals the cup.

This sealed cup assembly then is loaded into a high pressure cell which consists of pressure transmission and pressure sealing materials and then subjected to high pressure (e.g., 4.5-6.5 GPa) and high temperature (above 1200° C.) for 30-40 minutes to sinter the powder mixture and braze it to the substrate. The sintered blank is removed from the cell and machined to remove the cup material and to bring it to the desired dimensions. The finished blank is cut, either by electro-discharge machining (EDM) or by a laser, into shapes and sizes suitable for the manufacture of cutting tools used for machining powder metal iron and other similar materials. The size and shape of the described sintered blanks can be varied by changing the dimensions of the components and are primarily limited in dimension by the high pressure/high temperature (HPHT) equipment used to promote the sintering process.

The sintered cBN compact product comprises between about 80 vol % and 95 vol % cBN grains with mean size of about 1-2 microns (μm) with the remainder of the material consisting of the binder phase, which is uniformly dispersed among the cBN grains. During the HPHT process, an aluminum-containing compound added into the powder during the milling and blending step begins to react with the cubic boron nitride and begins the sintering. Cobalt from the cemented carbide substrate also liquefies during HMI and infiltrates the powder bed, eliminating any porosity and further aiding sintering. After the binder contains stoichiometric carbides, nitrides, or borides.

In one embodiment of the present application, the binder phase contains several phases that can be identified by X-ray diffraction techniques including, for example, aluminum nitride, cobalt, tungsten carbide, tungsten boride, and compounds of tungsten, boron and/or cobalt. These phases are formed during the sintering process by reaction of the blended powder components. Careful selection of the powder formulation and HPHT conditions results in a final material with lower unreacted cobalt than conventional materials. This inventive material has been shown to have measurable performance benefits over conventional materials.

The sintered cBN compact, then, can be formed into a tool for machining chemically reactive materials, such as, powder metal iron. The formation of such tools and the machining conditions used may be well known in the art and well-practiced commercially.

FIG. 1 presents a fine-grained high-cBN content material with roughly 90 vol % cBN hereinafter referred to as the inventive material. This preferred embodiment of the invention may comprise:

Black 110 at 3.607 vol % is a color that is not assigned.
Yellow at 120, 7.001 vol % represents CoB, W undetected.
Green 130 at 70.814 vol % represents B, Co and W undetected.
Red 140 at 1.142 vol % represents Co, B and W undetected.
Blue 150 at 3.23 vol % represents W, Co and B undetected
Cyan 160 at 9.72 vol % represents WB, Co undetected.
Magenta 170 at 2.281 vol % represents CoW, B undetected.
White, 180 at 2.973 vol % represents CoWB.

Figure 2:
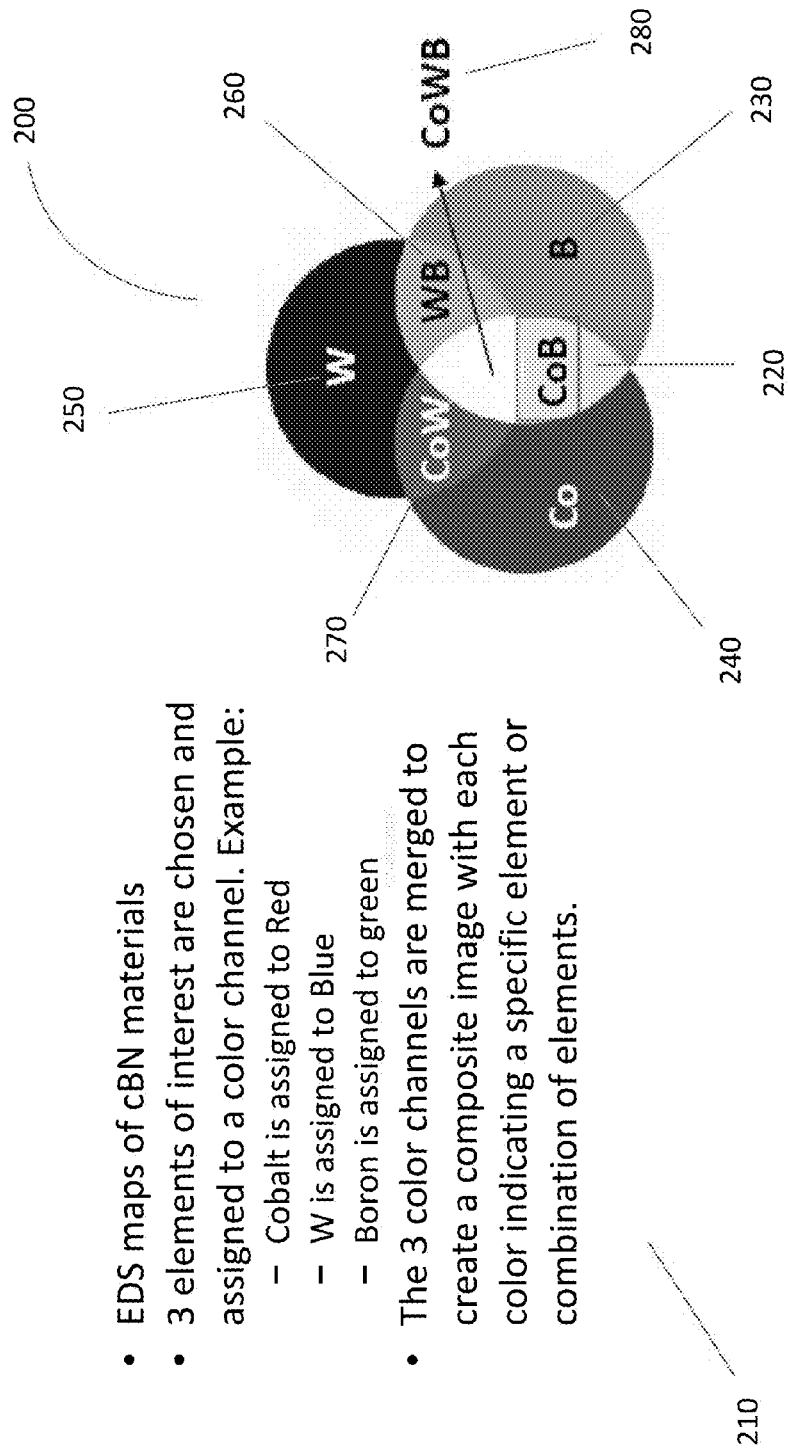
FIG. 2 is an elemental map of an embodiment of the invention with each specific color representing each individual substance.

FIG. 2 presents the elemental map of the substances 200 contained in the preferred embodiment. A color or combination of colors corresponds to the associated substance. A scanning electron microscope (SEM) was used to generate an Energy Dispersive X-Ray Spectroscopy (EDS) map of cBN materials such that the three elements of interest are chosen and assigned to a color channel. Cobalt is assigned to Red 240, W is assigned to Blue 250 and Boron is assigned to green 230. The three color channels are merged to create a composite image with each color indicating a specific element or combination of elements. In the present case, the colors representative of the elements, mixtures and compounds comprise:

The yellow 220, represents cobalt boride.
The green 230, represents boron alone.
The red 240, represents cobalt alone.
The Blue 250, represents tungsten.
The cyan 260, represents tungsten boride.
The Magenta 270, represents cobalt tungsten.
The white 280, represents cobalt tungsten boride.

Figure 3:
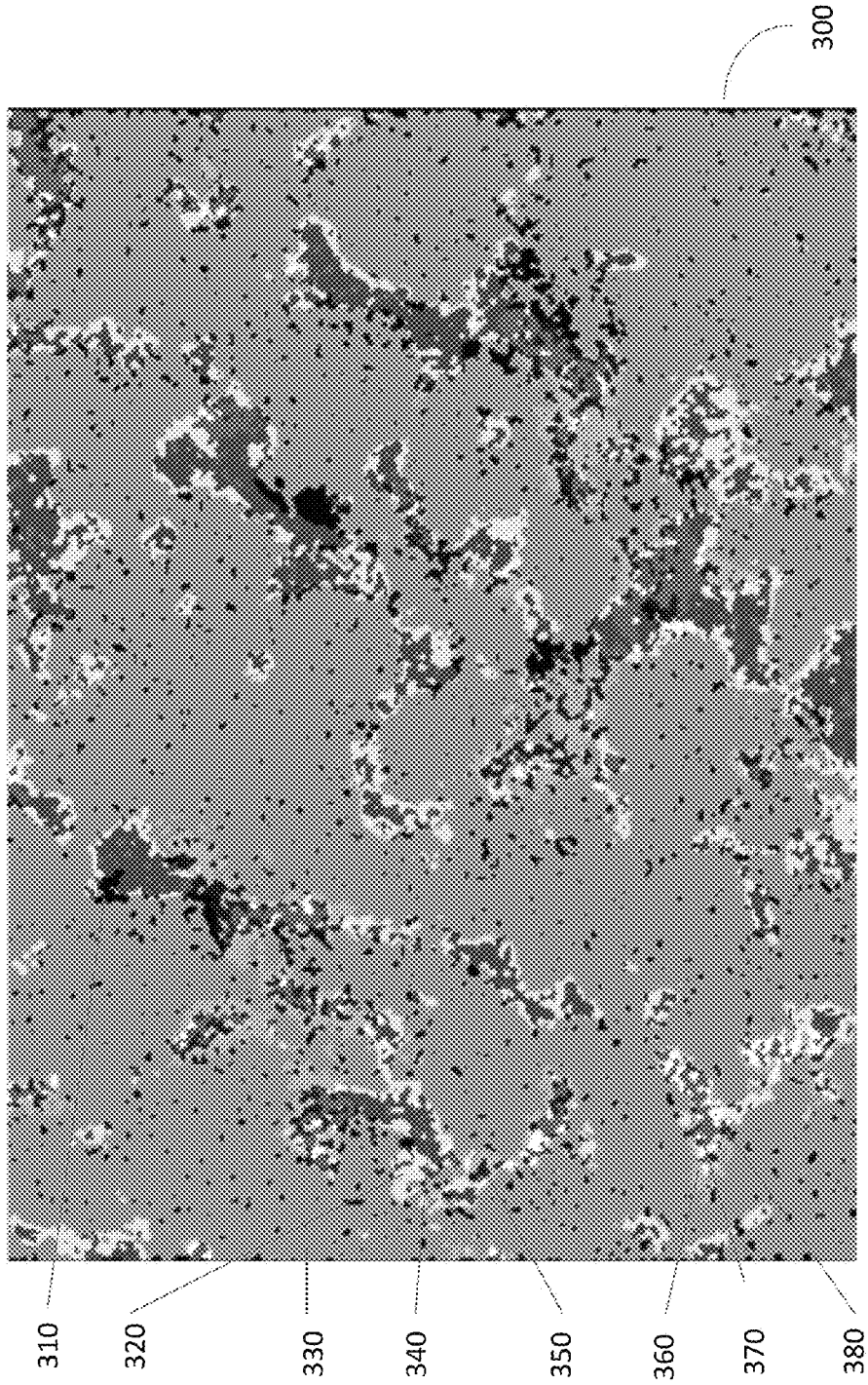
FIG. 3 is an electron microscope image of an elemental map of conventional material A

FIG. 3 presents conventional grade material A which is different from the inventive material and comprises:
Black 310 at 4.462 vol % is not assigned.
Yellow 320 at 7.49 vol % represents CoB.
Green 330 at 71.934 vol % represents B.
Red 340 at 6.076 vol % represents Co.
Blue 350 at 1.803 vol % represents W.
Cyan 360 at 3.75 vol % represents WB.
Magenta 370 at 3.212 vol % represents CoW.
White 380 1.334 vol % represents CoWB.

The presented material 300 differs from the inventive material because the amount of element 1 cobalt in the inventive material is significantly lower than the cobalt in other conventional grades. The reacted amount of cBN (CoB+WB) is significantly higher in the inventive material than in conventional grades.

Figure 4:
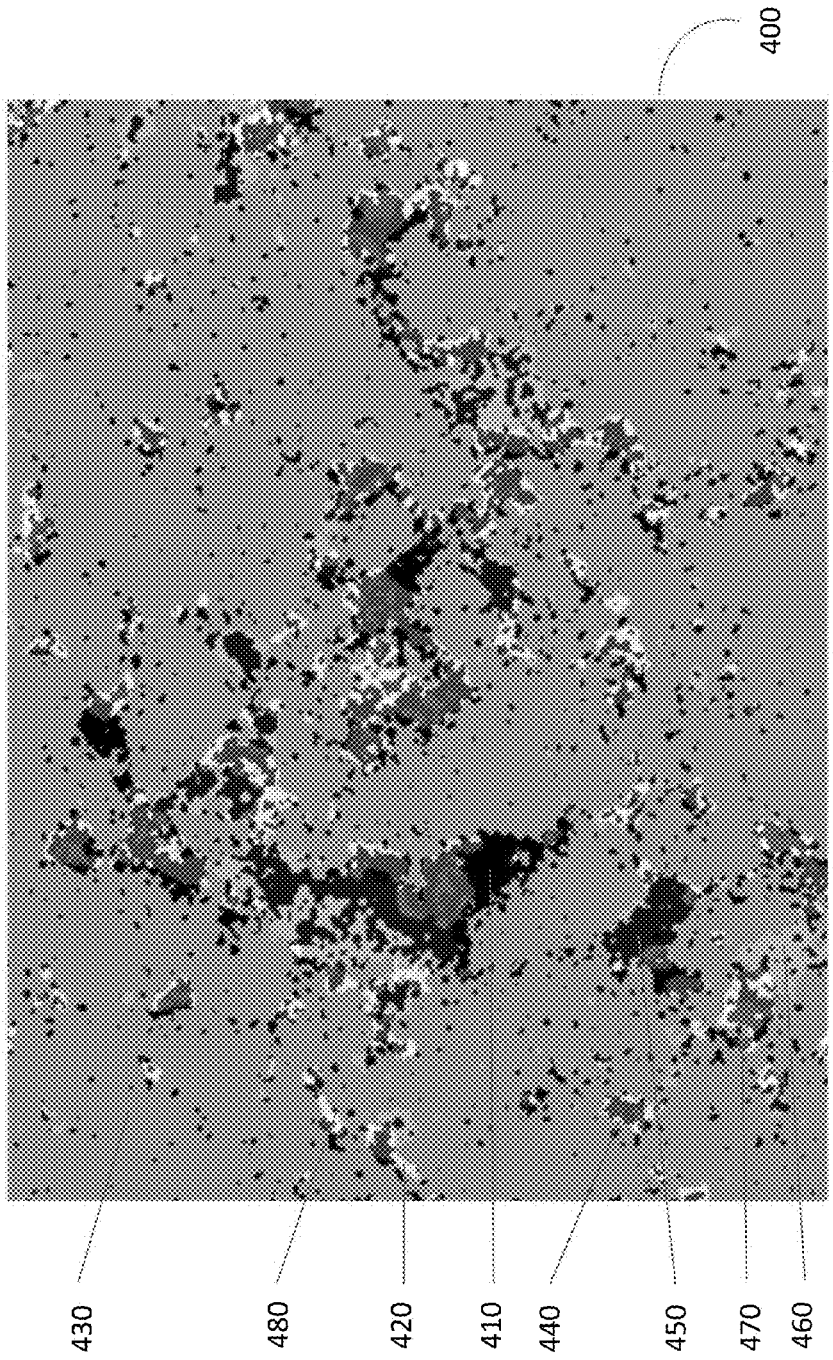
FIG. 4 is an electron microscope image of an elemental map of conventional material B

FIG. 4 presents conventional grade material B which comprises:
Black 410 at 5.269 is not assigned.
Yellow 420 3.156 represents CoB.
Green 430 at 78.841 vol % represents B.
Red 440 at 3.83 vol % represents Co.
Blue 450 at 1.681 vol % represents W.
Cyan 460 at 3.64 vol % represents WB.
Magenta 470 at 1.681 vol % represents CoW.
White 480 0.704 vol % represents CoWB.

Figure 5:
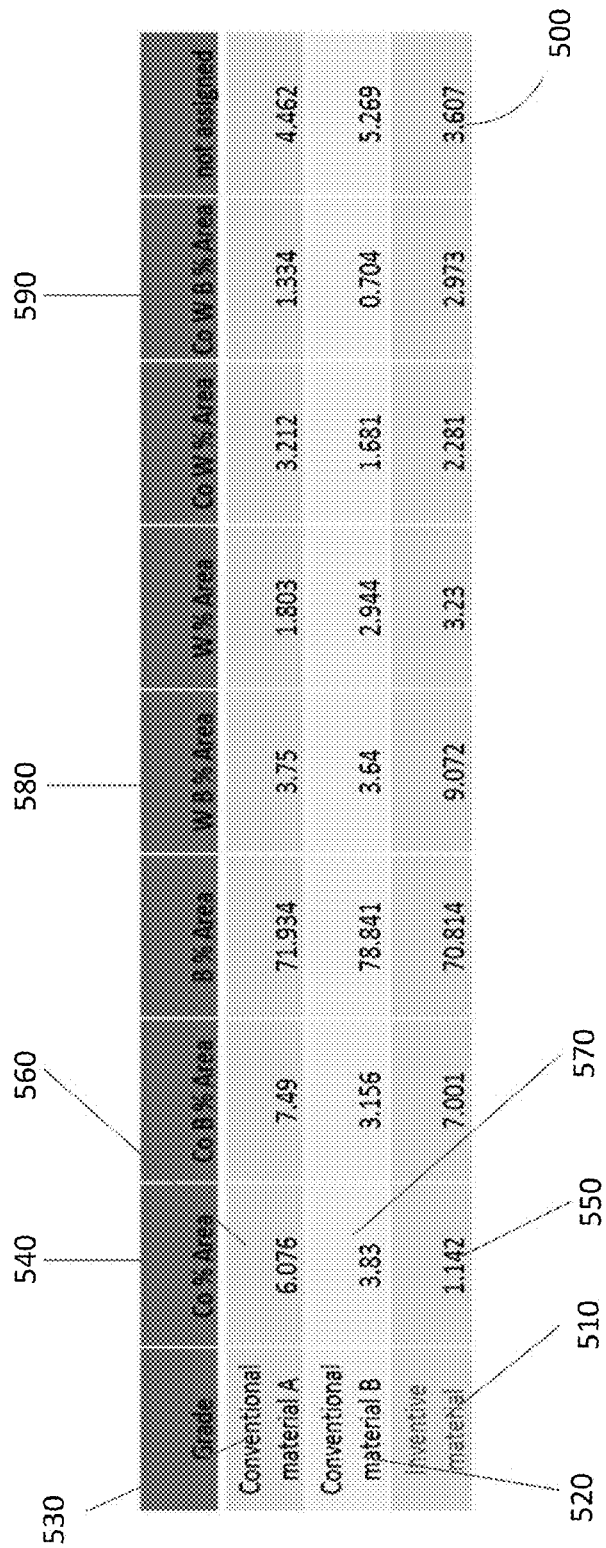
FIG. 5 is a chart representation summary of the elemental map image analysis of FIG. 1, FIG. 3 and FIG. 4.

FIG. 5 presents a summary of the elemental map image analysis 500. Here a comparison of the inventive material 510 with the conventional material A 520 and conventional material B 530 is presented. The amount of elemental cobalt 540 is significantly lower in the inventive material 550 than in the conventional materials 560 or 570. Furthermore, the amount of reacted B (CoB+WB) is significantly higher in the inventive material 580 than in the conventional material 590. Testing revealed in machining of sintered metal alloy gears, the inventive material resulted in longer tool life which exceeded the tool life of conventional materials. The tool life of the inventive materials exceeded the tool life of conventional material A by 3.8 times and the inventive material exceeded the life of conventional material B by 2.6 times.

Figure 6:
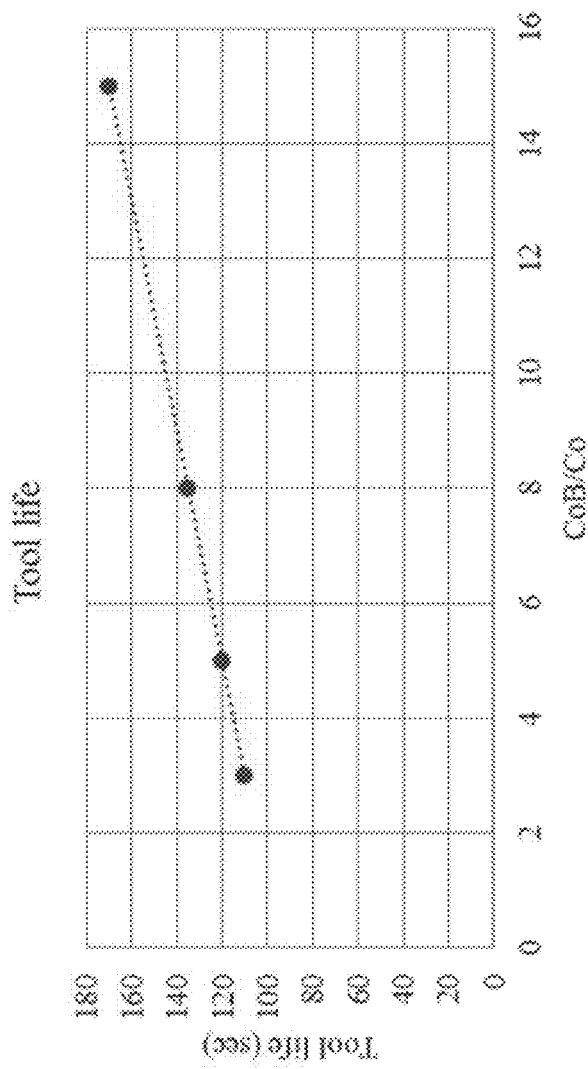
FIG. 6 is a graph representing summary of the tool life vs. CoB/Co ratio

FIG. 6 presents a graphical representation of tool life, wherein the X-axis is a ratio of CoB volume (vol %) to Co volume (vol %) and the Y-axis is tool life (minutes) in machining of sintered alloy gears at cutting conditions of 150 m/min, feed rate of 0.15 mm/rev and depth of cut of 0.1 mm with coolant. This figure clearly shows that an increase in tool life is directly proportional to an increase in CoB/Co ratio.

While the invention has been described with reference to a preferred embodiment, those skilled in the art will understand that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In this application all units are in the metric system and all amounts and percentages are by weight, unless otherwise expressly indicated. Also, all citations referred herein are expressly incorporated herein by reference.

The invention claimed is:
1. A fine-grained sintered compact comprising:
a volume of between 80% and 95% by volume cBN particles;
a metallic binder comprising
Co, W, Al, at least trace amount of each of W, CoW, WB, CoB, and at least one of Cr, Ni, V, and Mn; and
a cemented carbide backing,
wherein Co not reacted with W or B is present in an amount of 1-3 vol % of the fine grained sintered compact.

2. The compact of claim 1, wherein CoB represents between 3 vol % and 15 vol % of the fine grained sintered compact.

3. The compact of claim 1, wherein the sintered compact has been sintered at HPHT conditions at a pressure of at least 5 GPa and a temperature of at least 1200° C.

4. The compact of claim 1, wherein CoB is present in an amount of 3-15 vol % of the fine grained sintered compact, and WB is present in an amount of 0.1-10 vol % of the fine grained sintered compact, and wherein a ratio CoB/Co is 3-15, and a ratio CoB/WB is 0.5-15.

5. The compact of claim 1, wherein the binder has a grain size of 0.3-0.7 micron as represented by D50.

6. The compact of claim 1, wherein the cBN content is between 85 vol % and 95 vol % cBN.

7. The compact of claim 1, wherein the cemented carbide backing is cemented WC.

8. The compact of claim 3, wherein the HPHT pressure is at least 5.5 GPa.

9. The compact of claim 3, where in the HPHT pressure is at least 6 GPa.

10. The compact of claim 1, wherein the aluminum is from a source that comprises at least one of elemental aluminum or an aluminum intermetallic.

11. The compact of claim 10, wherein the aluminum is from a source that comprises elemental aluminum, $NiAl_3$, or $TiAl_3$.

12. The compact of claim 1, wherein the cobalt is from a source comprising the cemented carbide backing.

13. The compact of claim 12, wherein the the cemented carbide backing is a cemented WC backing.

14. The compact of claim 1, wherein the cBN particles have a D50 less than 5 microns.

15. The compact of claim 1, wherein the compact is used as a component of a cutting tool.

16. The compact of claim 1, wherein the cBN particles have a D50 less than 2 microns.

17. A fine-grained sintered compact comprising:
a volume of between 80% and 95% by volume cBN;
a metallic binder comprising Co, W, Al,
at least trace amount of each of W, CoW, WB, CoB, and at least one of Cr, Ni, V, and Mn; and
a cemented carbide backing,
wherein CoB is present in an amount of 3-15 vol % of the fine grained sintered compact, unalloyed cobalt is present in an amount of 1-3 vol % of the fine grained sintered compact, and WB is present in an amount of 0.1-10 vol % of the fine grained sintered compact, and wherein a ratio CoB/Co is 3-15, and a ratio CoB/WB is 0.5-15.

18. The compact of claim 17, wherein the compact is sintered at about 5 GPa.

19. The compact of claim 17, wherein the compact is sintered at a temperature of at least 1200° C.

20. A method of manufacturing a fine-grained sintered compact comprising:
sintering a composition comprising
a volume of between 80% and 95% by volume cBN;
a metallic binder comprising
Co, W, Al,
at least trace amount of each of W, CoW, WB, CoB, and
at least one of Cr, Ni, V, and Mn,
wherein Co not reacted with W or B is present in an amount of 1-3 vol % of the fine grained sintered compact; and
a cemented carbide backing.

* * * * *